(No Model.) 2 Sheets—Sheet 1.
C. W. BOOTH.
PASTRY LOOSENER.
No. 562,275. Patented June 16, 1896.
FIG. 1.
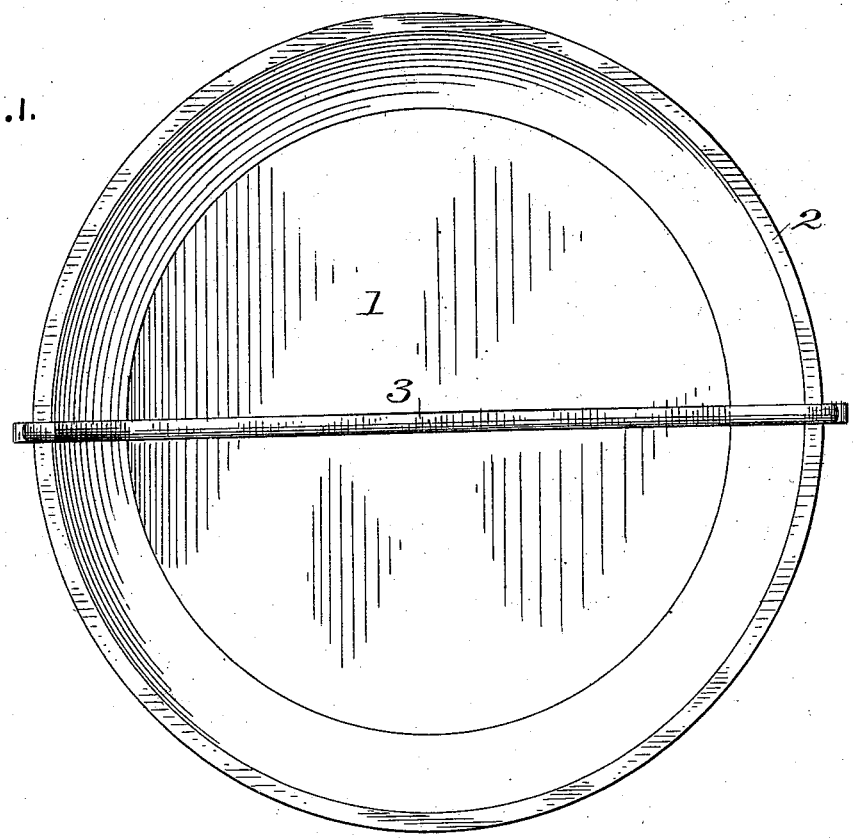
FIG. 2.
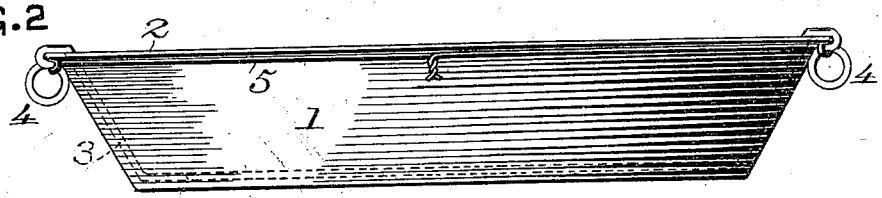
FIG. 3.    FIG. 5.
FIG. 4.
WITNESSES:    FIG. 6.    INVENTOR:
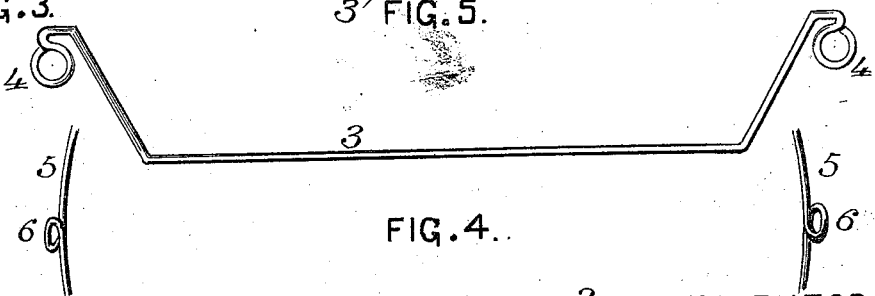
Chas. F. Miller.    Chas. W. Booth,
F. E. Gaither.    by J. Snowden Bell,
     atty.

(No Model.) 2 Sheets—Sheet 2.

C. W. BOOTH.
PASTRY LOOSENER.

No. 562,275. Patented June 16, 1896.

WITNESSES:
Chas. F. Miller.
J. E. Gaither.

INVENTOR
Chas. W. Booth,
by Snowden Bell,
atty.

ANDREW B.GRAHAM. PHOTO-LITHO. WASHINGTON. D.C.

UNITED STATES PATENT OFFICE.

CHARLES W. BOOTH, OF WAUKESHA, WISCONSIN.

PASTRY-LOOSENER.

SPECIFICATION forming part of Letters Patent No. 562,275, dated June 16, 1896.

Application filed March 20, 1896. Serial No. 584,086. (No model.)

*To all whom it may concern:*

Be it known that I, CHARLES W. BOOTH, of Waukesha, in the county of Waukesha and State of Wisconsin, have invented a certain new and useful Improvement in Pastry-Looseners, of which improvement the following is a specification.

The object of my invention is to provide a simple and inexpensive device for loosening or detaching the contents of a baking-pan therefrom, which may be applied in connection with a baking pan or dish of any description, without cutting, perforating or defacing the same.

To this end my invention, generally stated, consists in the combination, with a baking pan or dish, of a blade or knife formed to fit against the bottom and sides of the pan or dish, and a retaining-rod engaging the ends of the blade and fitting below the rim of the pan or dish.

The improvement claimed is hereinafter fully set forth.

Figure 7:
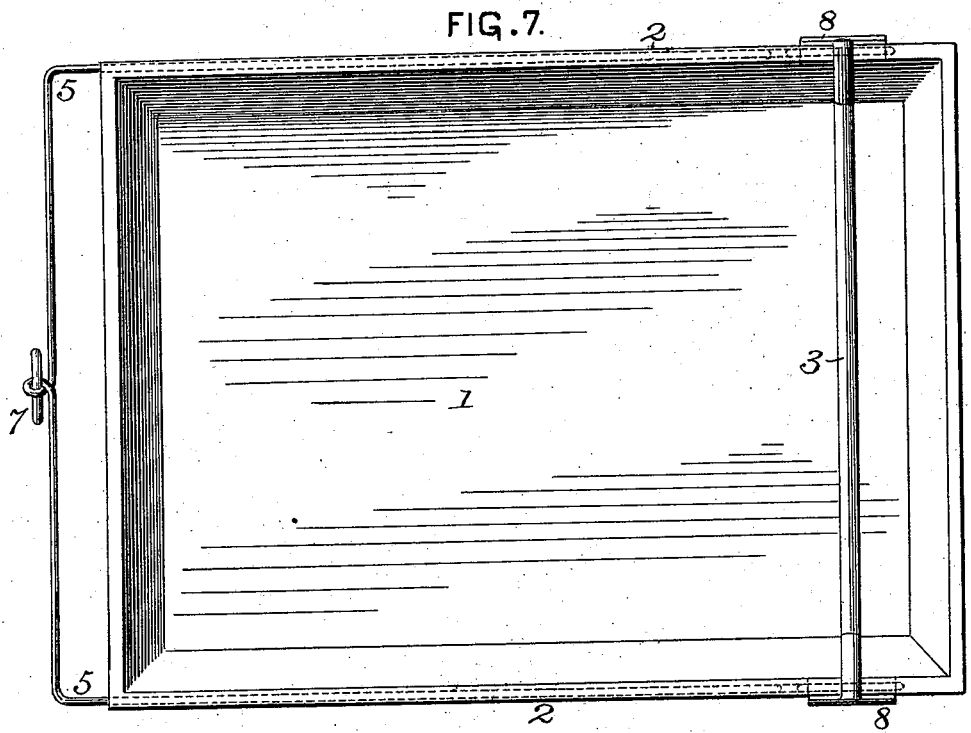
Figure 8:
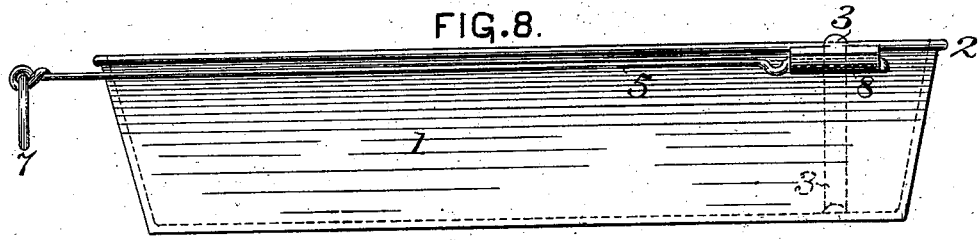
Figure 9:
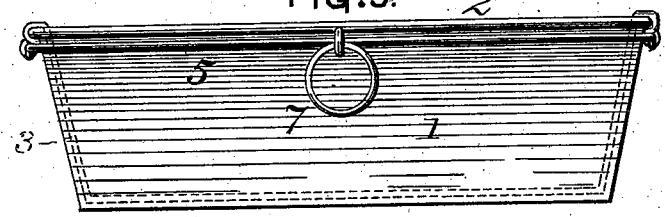
Figure 10:

In the accompanying drawings, Figure 1 is a plan or top view of a circular baking-pan, illustrating an application of my invention; Fig. 2, a side view in elevation of the same; Fig. 3, a similar view of the knife or blade detached; Fig. 4, a plan view showing two diametrically opposite portions of the retaining-rod; Fig. 5, a transverse section, on an enlarged scale, of the knife or blade; Fig. 6, a partial transverse section through a baking-pan, showing a modified form of the retaining-rod. Figs. 7, 8, and 9 are plan, side, and end views of a rectangular baking-pan with my invention applied; and Fig. 10, a view in perspective of one end of the knife or blade of Figs. 7, 8, and 9.

Referring first to Figs. 1 to 6, inclusive, my invention is shown as applied in connection with an ordinary circular baking-pan 1, the sides of which are upwardly and outwardly inclined in the usual manner, and which is provided with an outwardly-extending rim 2 at its top. A metallic knife or blade 3, which is preferably of the form in transverse section shown in Fig. 5, (that is to say, having a flat bottom and a curved top, which join and form cutting edges on opposite sides of the knife,) is so bent or formed longitudinally as to fit against the bottom and sides of the pan 1 and to project over the rim 2 thereof, beyond which its ends may be turned into loops or handles 4, of circular or other curved form. In order to prevent the displacement of the knife 3 from the pan, while permitting its free traverse relatively thereto when required, it is connected loosely thereto by a retaining rod or wire 5, which fits under the rim 2 of the pan and engages each end of the knife.

In the preferred form of the retaining-rod 5, which is shown in Figs. 2, 3, and 4, it is bent into a circle of such diameter as to fit freely around the pan just below the rim 2, with two diametrically opposite eyes or sockets 6, with which the end portions of the knife 3 are engaged, such engagement effecting a loose connection of the knife to the pan, which prevents the knife from being raised or detached from the pan, but allows it to be moved freely over the inner surface thereof. The ends of the retaining-rod are connected by being twisted together, as shown in Fig. 2, and its downward displacement is prevented by its connection with the blade or knife 3.

In the alternative form of the retaining-rod shown in Fig. 6, the eyes or sockets 6 are dispensed with, and their function is similarly performed by recesses or indentations on the lower side of the retaining-rod, into which the ends of the knife 3 are inserted.

While I have shown, in each case, the retaining-rod 5 as circular in transverse section, it will be obvious that its form and dimensions in transverse section are not material in the practice of my invention, the only requirement, in this regard, being that it shall perform the function of a connecting element between the pan or dish and the knife, which shall retain the latter in operative relation to the former by a bearing on the under side of the rim and a suitable connection to the knife, as by eyes or sockets, or by recesses or indentations with which the ends of the knife engage.

In operation, the knife is rotated with one hand while the pan is held with the other, and its movement readily and quickly detaches the contents of the pan from the surfaces thereof, thereby permitting their removal intact and preventing the sticking, which is a familiar objection in ordinary culinary operations.

Figs. 7 to 9, inclusive, illustrate the application of my invention in connection with a quadrangular pan, in which case the knife or blade 3 is, as before described, so formed longitudinally as to fit closely against the bottom and sides of the pan, and is similarly connected thereto by a retaining-rod 5, so as to be freely movable over the inner surface of the pan without detachment therefrom. The retaining-rod is bent into substantially U form, so as to fit against the sides of the pan 1 below its rim 2, and its middle portion is preferably, as shown, looped to engage a ring 7, by which it, and the connected knife 3, may be moved longitudinally on the pan. The ends of the knife are widened to form long bearings on the rim of the pan and prevent tilting of the blade, and the ends of the retaining-rod are inserted in sockets 8, formed by bending over the widened ends of the knife. The retaining-rod is bent at the ends of the sockets 8, to prevent displacement therefrom, as shown in Fig. 8. It will be obvious that the blade or knife may be provided, if desired, with similar widened end bearings when used with a circular pan.

My improvement is readily applicable at slight cost, in connection with baking pans or dishes of any description having a rim, whether the same be of tinware, ironware, earthenware, or any other material of which culinary utensils are manufactured. Inasmuch as the utensil is not cut, perforated, or defaced in any manner, its utility and durability are not impaired, and the objections of liability to accumulation of rust or lack of cleanliness, which obtain, to a greater or less degree, with attachments which are connected by riveting or soldering, are wholly avoided.

I claim as my invention and desire to secure by Letters Patent—

1. The combination, substantially as set forth, of a baking pan or dish, a blade or knife formed to fit against the bottom and sides thereof, and a retaining-rod engaging the ends of the blade and fitting below the rim of the pan or dish.

2. The combination, substantially as set forth, of a baking pan or dish, a blade or knife formed to fit against the bottom and sides thereof, and a retaining-rod having eyes or sockets engaging the ends of the blade and fitting freely on the pan or dish below the rim thereof.

3. The combination, substantially as set forth, of a baking pan or dish, a blade or knife formed to fit against the bottom and sides thereof and having bearings of greater width on the rim thereof, and a retaining-rod engaging the ends of the blade, and fitting below the rim of the pan or dish.

CHARLES W. BOOTH.

Witnesses:
  J. EMMETT BROWN,
  FRED MCCOY.